United States Patent
Feng et al.

(10) Patent No.: US 10,230,735 B2
(45) Date of Patent: Mar. 12, 2019

(54) ROLE-BASED PERMISSIONS FOR HIERARCHY-BASED RELATIONSHIPS

(71) Applicant: SuccessFactors, Inc., South San Francisco, CA (US)

(72) Inventors: Jia Feng, Daly City, CA (US); Yulong Yang, Shanghai (CN); Lu Luo, Daly City, CA (US); Jessica Yang, Sunnyvale, CA (US); Edward Lu, American Canyon, CA (US)

(73) Assignee: SUCCESSFACTORS, INC., South San Francisco, CA (US)

( * ) Notice: Subject to any disclaimer, the term of this patent is extended or adjusted under 35 U.S.C. 154(b) by 163 days.

(21) Appl. No.: 14/984,097

(22) Filed: Dec. 30, 2015

(65) Prior Publication Data
US 2017/0195329 A1    Jul. 6, 2017

(51) Int. Cl.
*H04L 29/06*    (2006.01)

(52) U.S. Cl.
CPC .................. *H04L 63/102* (2013.01)

(58) Field of Classification Search
CPC ...................................................... H04L 63/10
See application file for complete search history.

(56) References Cited

U.S. PATENT DOCUMENTS

| | | | | |
|---|---|---|---|---|
| 7,984,066 B1* | 7/2011 | Kilday | | G06F 21/6218 707/781 |
| 8,635,707 B1* | 1/2014 | Parenti | | G06F 21/6218 713/182 |
| 9,547,764 B2* | 1/2017 | Biswas | | G06F 21/44 |
| 2009/0182607 A1* | 7/2009 | Morinville | | G06Q 10/06 705/7.14 |
| 2013/0326580 A1* | 12/2013 | Barclay | | H04L 63/101 726/1 |

(Continued)

OTHER PUBLICATIONS

Wen et al., Three-Layers Role-Based Access Control Framework in Large Financial Web Systems, IEEE, 2009 International Conference on Computational Intelligence and Software Engineering, pp. 1-4 (Year: 2009).*

(Continued)

*Primary Examiner* — Luu T Pham
*Assistant Examiner* — Harvey I Cohen
(74) *Attorney, Agent, or Firm* — Fountainhead Law Group P.C.

(57) ABSTRACT

Some embodiments provide a program that receives, from an application, a role-based permission (RBP) request specifying an RBP, a first user, and a second user. The RBP specifies a set of actions, a first set of users authorized to perform the set of actions, a second set of users on which the first set of users is authorized to perform the set of actions, and a relationship condition. When the relationship condition specifies a hierarchy-based relationship, the program determines valid users in the second set of users according to a hierarchy of users. When the relationship condition specifies a non-hierarchy-based relationship, the program determines valid users in the second set of users according to a relationship not based on the hierarchy of users. The program determines whether the first user is authorized to perform the set of actions on the second user based on the determined valid users.

20 Claims, 7 Drawing Sheets

(56) References Cited

U.S. PATENT DOCUMENTS

| | | | | |
|---|---|---|---|---|
| 2015/0135261 A1* | 5/2015 | Park | ............... | H04L 63/102 |
| | | | | 726/1 |
| 2015/0200943 A1* | 7/2015 | Pitre | ............... | H04L 63/102 |
| | | | | 726/1 |
| 2016/0036827 A1* | 2/2016 | Kling | ............ | G06F 21/6218 |
| | | | | 726/12 |
| 2016/0087960 A1* | 3/2016 | Pleau | ............ | H04L 63/0884 |
| | | | | 726/7 |
| 2016/0205081 A1* | 7/2016 | Simons | ............ | H04L 41/22 |
| | | | | 715/743 |

OTHER PUBLICATIONS

Wei-Design and Implementation of Rights Management System Based on RBAC Model, IEEE, 2011 International Conference on Computer and Management (CAMAN), pp. 1-4 (Year: 2011).*

Asaf et a., Role based access control architectural design issues in large organizations, IEEE, 2014 International Conference on Open Source Systems & Technologies, pp. 197-205 (Year: 2014).*

* cited by examiner

ROLE-BASED PERMISSIONS FOR HIERARCHY-BASED RELATIONSHIPS

BACKGROUND

Different types of approaches may be used for different types of access control in computing systems. For instance, one approach uses access control lists (ACLs) to manage access to computing resources (e.g., files, programs, etc.), network resources, network services, etc. Another approach uses role-based access control to manage user access in computing systems. In such an approach, roles are defined and assigned to users. Based on different roles, users may be allowed to perform different operations.

SUMMARY

In some embodiments, a non-transitory machine-readable medium stores a program that is executable by at least one processing unit of a device. The program receives, from an application, a role-based permission (RBP) request specifying an RBP, a first user, and a second user. The RBP specifies a set of actions, a first set of users authorized to perform the set of actions, a second set of users on which the first set of users is authorized to perform the set of actions, and a relationship condition. When the relationship condition specifies a hierarchy-based relationship, the program determines valid users in the second set of users according to a hierarchy of users. When the relationship condition specifies a non-hierarchy-based relationship, the program determines valid users in the second set of users according to a relationship not based on the hierarchy of users. The program determines whether the first user is authorized to perform the set of actions on the second user based on the determined valid users.

In some embodiments, the program also sends a response to the application indicating that the first user is authorized to perform the set of actions on the second user when the first user is determined to be authorized to perform the set of actions on the second user. The program may further send a response to the application indicating that the first user is not authorized to perform the set of actions on the second user when the first user is determined to not be authorized to perform the set of actions on the second user. In some embodiments, the hierarchy of users is a manager-employee hierarchy of employees in an organization. The non-hierarchy-based relationship may include a matrix relationship.

In some embodiments, the hierarchy-based relationship specifies the hierarchy of users and a descendant distance threshold. The determining of valid users in the second set of users according to the hierarchy of users includes determining that a user in the second set of users is a valid user when the user in the second set of users is a child or descendant of the first user and a level difference between the user in the second set of users and the first user is within the descendant distance threshold. In some embodiments, the device includes memory. In some such embodiments, the program may generate a representation of the hierarchy of users in the memory of the device.

In some embodiments, a method receives, from an application, a role-based permission (RBP) request specifying an RBP, a first user, and a second user. The RBP specifies a set of actions, a first set of users authorized to perform the set of actions, a second set of users on which the first set of users is authorized to perform the set of actions, and a relationship condition. When the relationship condition specifies a hierarchy-based relationship, the method determines valid users in the second set of users according to a hierarchy of users. When the relationship condition specifies a non-hierarchy-based relationship, the method determines valid users in the second set of users according to a relationship not based on the hierarchy of users. The method also determines whether the first user is authorized to perform the set of actions on the second user based on the determined valid users.

In some embodiments, the RBP further specifies an ancestor distance threshold. The determining of valid users in the second set of users according to the hierarchy of users when the relationship condition specifies a hierarchy-based relationship may include determining that a user in the second set of users is a valid user when a first level difference between the user in the second set of users and a user in the first set of users is within the descendant distance threshold and a second level difference between the user in the first set of users and the first user is within the ancestor distance threshold. In some embodiments, the hierarchy of users is a manager-employee hierarchy of employees in an organization.

In some embodiments, the method sends a response to the application indicating that the first user is authorized to perform the set of actions on the second user when the first user is determined to be authorized to perform the set of actions on the second user. The method may sends a response to the application indicating that the first user is not authorized to perform the set of actions on the second user when the first user is determined to not be authorized to perform the set of actions on the second user. In some embodiments, the non-hierarchy-based relationship includes a matrix relationship. The method may generate a representation of the hierarchy of users in memory of a device.

In some embodiments, a system includes a role-based permission (RBP) processor configured to receive, from an application, a RBP request specifying an RBP, a first user, and a second user. The RBP specifies a set of actions, a first set of users authorized to perform the set of actions, a second set of users on which the first set of users is authorized to perform the set of actions, and a relationship condition. The system also includes a hierarchy manager configured to determine valid users in the second set of users according to a hierarchy of users when the relationship condition specifies a hierarchy-based relationship and determine valid users in the second set of users according to a relationship not based on the hierarchy of users when the relationship condition specifies a non-hierarchy-based relationship. The RBP processor is further configured to determine whether the first user is authorized to perform the set of actions on the second user based on the determined valid users.

In some embodiments, the RBP processor is further configured to send a response to the application indicating that the first user is authorized to perform the set of actions on the second user when the first user is determined to be authorized to perform the set of actions on the second user. The RBP processor may be further configured to send a response to the application indicating that the first user is not authorized to perform the set of actions on the second user when the first user is determined to not be authorized to perform the set of actions on the second user. In some embodiments, the hierarchy of users is a manager-employee hierarchy of employees in an organization.

In some embodiments, the RBP further specifies an ancestor distance threshold. In some such embodiments, the hierarchy manager determines valid users in the second set of users according to the hierarchy of users when the relationship condition specifies a hierarchy-based relationship by determining that a user in the second set of users is a valid user when a first level difference between the user in the second set of users and a user in the first set of users is within the descendant distance threshold and a second level difference between the user in the first set of users and the first user is within the ancestor distance threshold. In some embodiments, the non-hierarchy-based relationship comprises a matrix relationship.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are novel techniques for processing role-based permissions (RBPs) in order to manage user access associated with applications operating on a computing system. In some embodiments, the novel techniques process RBPs based on the manner in which users relate to each other (e.g., user relationships). User relationships may be specified according to a defined hierarchy of users, may be defined relationships that are not based on the defined hierarchy of users, or may include a combination of hierarchy-based relationships and non-hierarchy-based relationships. Based on the user relationships associated with RBPs, users may be authorized to access applications, application data, etc.

Figure 1:
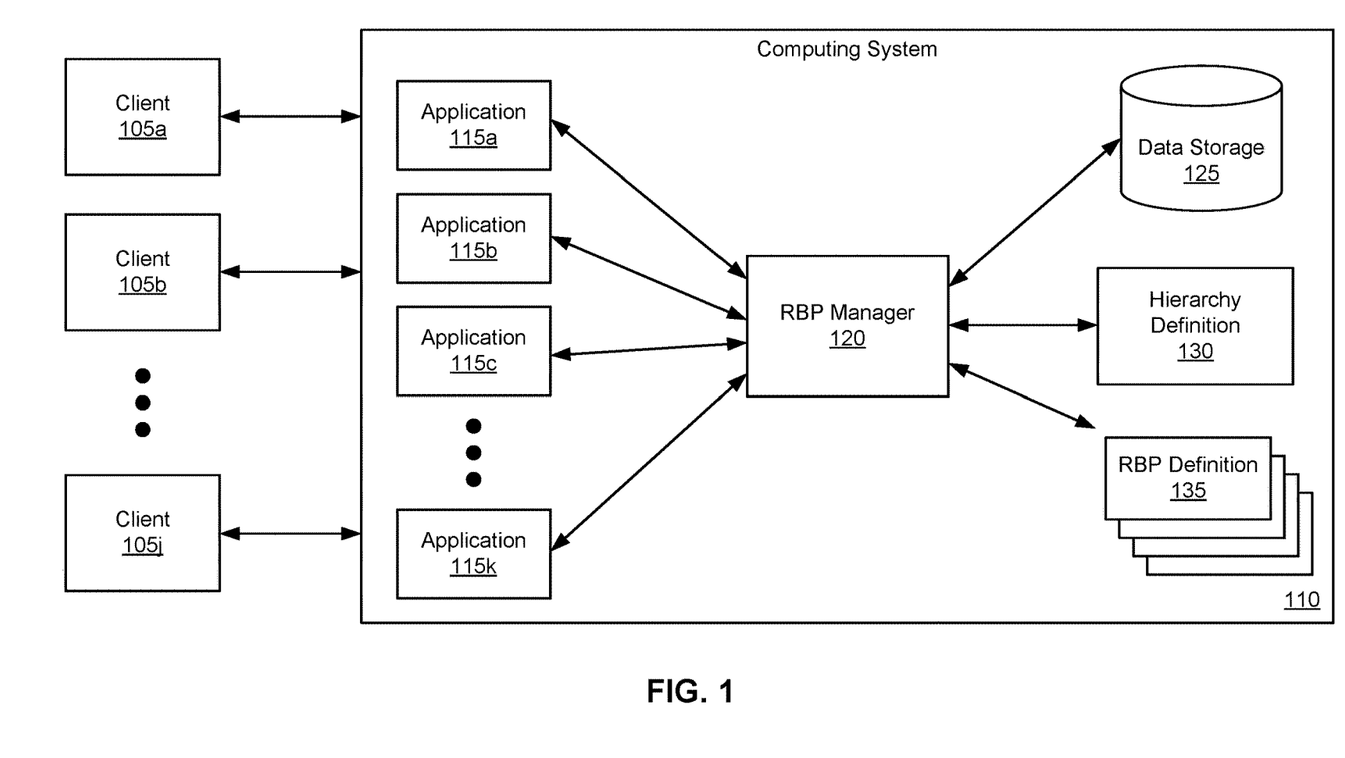
FIG. 1 illustrates a system for processing RBPs according to some embodiments.

FIG. 1 illustrates a system 100 for processing RBPs according to some embodiments. As shown, system 100 includes clients 105a-j and computing system 110. Clients 105a-j may be configured to access (e.g., via a web browser) applications 115a-k operating on computing system 110. This way, users (not shown) may use clients 105a-j to access applications 115a-k on computing system 110. Clients 105a-j may be any type of electronic device (e.g., a desktop computer, a laptop, a tablet, a mobile device, a wearable device, etc.).

Computing system 110 is a system that allows users to access and interact with applications 115a-k via clients 105a-j. Computing system 110 may employ an RBP-based methodology for managing user access and/or operations associated with applications 115a-k, data on computing system 110, or any other type of resources on computing system 110. In some embodiments, RBPs are defined based on user relationships. This way, user access and/or operations may be controlled according to specified relationships among users. In some embodiments, the user relationships may be based on a defined hierarchy of users (also referred to as hierarchy-based relationships), may be defined relationships that are not based on the defined hierarchy of users (also referred to as non-hierarchy-based relationships), or may include a combination of hierarchy-based relationships and non-hierarchy-based relationships.

An example of hierarchy-based relationships may be manager-employee relationships specified according to a manager-employee hierarchy of employees in an organization. Non-hierarchy-based relationships in such an example may include relationships that are defined based on employees' location, department, division, etc. (also referred to as matrix relationships). A matrix relationship may specify a particular employee (also referred to as a matrix manager or a project leader) and one or more other employees (also referred as matrix reports or project reports) to which the particular employee serves as a leader. One of ordinary skill in the art will realize that additional and/or different types of non-hierarchy-based relationships are possible. For instance, non-hierarchy-based relationships may include relationships that specify a human resources (HR) employee (also referred to as an HR manager) and one or more other employees (also referred as HR reports) to which the HR employee serves as a point of contact for issues related to HR.

An RBP may be defined by an RBP definition. In some embodiments, an RBP definition specifies a set of actions (also referred to as permissions), one or more users that are allowed to perform the set of actions (also referred to as an access group), one or more users on which the access group may perform the set of actions (also referred to as a target group), and the manner in which an access group user and a target group user is related in order for the access group user to perform the set of actions on the target group user (also referred to as a relationship condition). One of ordinary skill in the art will understand that an RBP definition may specify additional and/or different elements in order to define an RBP.

An RBP definition map specify the access group and target group by listing individual users, users having a particular set of attributes, or a combination thereof. The set of actions specified in an RBP definition may be associated with data access (e.g., creating data, viewing data, editing data, updating data, etc.), a list of applications (e.g., applications 115a-k) in which data access may be performed, or any other types of operations associated with interacting with applications and/or application data. In some embodiments, a relationship condition may specify that access group users and target group users are related according to hierarchy-based relationships, non-hierarchy-based relationships, or a combination of hierarchy-based relationships and non-hierarchy-based relationships. For a relationship condition that includes hierarchy-based relationships, the relationship condition may specify a number of levels in the hierarchy within which a target group user and an access group user may be separated (also referred to as a descendant distance threshold). For a relationship condition that includes hierarchy-based relationships or a combination of hierarchy-based relationships and non-hierarchy-based relationships, the relationship condition may specify a number of levels in the hierarchy within which a user and an access group user may be separated (also referred to as an ancestor distance threshold).

In some embodiments, a user may be assigned one or more defined RBPs. When a user accesses an application 115 via a client 110, computing system 110 processes the RBPs assigned to the user to determine whether the user is authorized to access application 115, data associated with application 115, data associated with users of computing system 110, etc. Continuing with the example above, an employee may be assigned an RBP defined for managers in the organization. The employee may request to view another employee's data (e.g., salary) provided through an application 115. Based on the RBP defined for managers and the relationship between the employee and the other employee according to the manager-employee hierarchy, computing system 110 may authorize or deny the employee's request to view the other employee's data.

In some embodiments, computing system 110 is a multi-tenant. For instance, in some such embodiments, each of the applications 110a-k may serve some or all of the clients 105a-j. Computing system 110 may be, in some embodiments, a cloud-based system implemented using a software as a service (SaaS) methodology. One of ordinary skill in the art will understand that computing system 110 may be one of any number of different systems (e.g., a human capital management (HCM) system, an enterprise resource planning (ERP) system, a customer relationship management (CRM) system, a supply chain management (SCM) system, a product lifecycle management (PLM) system, etc.). In addition, one of ordinary skill in the art will appreciate that computing system 110 may be part of, or include, any number of such different systems.

As shown in FIG. 1, computing system 110 includes applications 115a-k, RBP manager 120, data storage 125, hierarchy definition 130, and RBP definitions 135. Applications 115a-k may be a desktop application, a web application/service, etc. In some embodiments, applications 115a-k may be applications for any of the different systems mentioned above (e.g., HCM applications, ERP applications, CRM applications, SCM applications, PLM applications, etc.). In some embodiments, applications 115a-k operate on the same computing device as computing system 110 while, in other embodiments, applications 115a-k operate on a computing device (e.g., an application server) separate from computing system 110. Hierarchy definition 130 may store a definition of a hierarchy of users (e.g., the manager-employee hierarchy mentioned above). RBP definitions 135 may store definitions of RBP that are defined in the manner described above RBP manager 120 is responsible for processing RBP requests received from applications 115a-k. In response to an RBP request from an application 115, RBP manager 120 sends a response to the application 115 that indicates whether the RBP request is approved or denied (e.g., whether a user may perform an action on another user as specified in the RBP request).

As mentioned above, RBPs may be defined based on user relationships in a defined hierarchy of users. RBP manager 120 may manage hierarchies used to define RBPs. For instance, RBP manager 120 may generate a representation of the hierarchy (e.g., a tree data structure) defined by hierarchy definition 130 and maintain the representation of the hierarchy (e.g., updating the representation of the hierarchy in response to changes to hierarchy definition 130). In some embodiments, the RBP manager 120 uses a representation of a hierarchy to process RBPs, the details of which will be described below by reference to FIGS. 2-6.

In some embodiments, RBP manager 120 implements the representation of the hierarchy in-memory. For example, RBP manager 120 generates and maintains the representation of the hierarchy in the memory of a computing device on which RBP manager 120 is operating. In some such embodiments, the memory may be non-volatile memory (e.g., flash memory), volatile memory (e.g., dynamic random access memory (DRAM), static random-access memory (SRAM), etc.), or a combination of non-volatile memory, volatile memory, and/or other types of memory.

In some embodiments, RBP manager 120 may employ different data compression techniques in order to reduce the amount of memory that the RBP manager 120 uses. For instance, RBP manager 120 may generate and maintain indexes for some or all of the data stored in data storage 125. For example, RBP manager 120 may generate and maintain indexes for data associated with users (e.g., user identifiers (IDs), user attributes, etc.), non-hierarchy-based relationships (e.g., matrix relationships, HR relationships), etc. In some embodiments, RBP manager 120 generates and maintains such indexes in-memory in the same or similar manner as the hierarchies described above.

Data storage 125 may store data associated with users (e.g., user attributes such as location, department, division, etc.; user IDs; etc.), non-hierarchy-based relationships (e.g., matrix relationships), etc. In some embodiments, data storage 125 stores hierarchy definition 130 and RBP definitions 135. Data storage 125 may serve as a secondary and/or persistent storage. Data storage 125 may be implemented as one or more non-volatile storages (e.g., hard disk storages, flash memory storages, optical disc storages, etc.). In some embodiments, data storage 125 stores all, or a portion of, data in a database.

Figure 2:
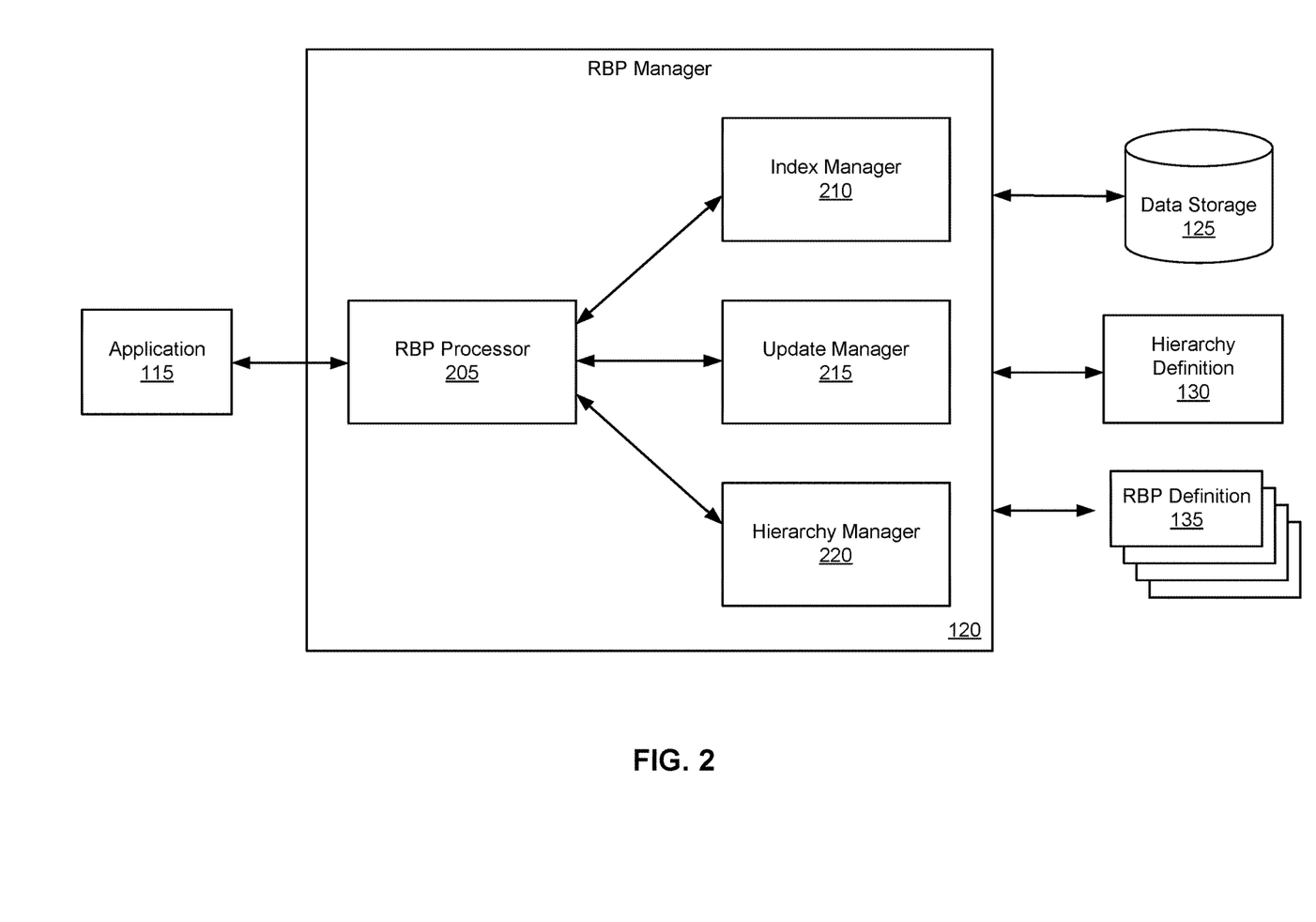
FIG. 2 illustrates an RBP manager according to some embodiments.

FIG. 2 illustrates RBP manager 120 according to some embodiments. As described above, RBP manager 120 is responsible for processing RBP requests received from applications 115a-k. As shown in FIG. 2, RBP manager 120 includes RBP processor 205, index manager 210, update manager 215, and hierarchy manager 220.

RBP processor 205 manages the processing of RBP requests that RBP processor 205 receives from applications 115a-j. In some embodiments, an RBP request includes a RBP, a user requesting to perform a set of actions (also referred to as a requesting user), and a user on which the set of actions is requested to be performed (also referred to as a requested user). Based on a received RBP request, RBP processor may access RBP definitions 135 to identify a RBP definition 135 associates with the RBP request. RBP processor 205 may then instruct hierarchy manager 220 to determine valid target users based on the RBP. In some embodiments, a valid target user is a target group user that has a relationship with a requesting user that satisfies the relationship condition. Based on the response that the RBP processor 205 receives from hierarchy manager 220, RBP processor 205 sends a response to the application 115 indicating whether the RBP request is approved or denied.

RBP processor 205 may also handle the initialization process (e.g., operations performed upon startup of RBP manager 120) for RBP manager 120. For instance, RBP processor 205 may access hierarchy definition 130 to generate a representation of a hierarchy of users (e.g., a tree data structure) defined by hierarchy definition 130. RBP processor 205 may also access data storage 125 to generate indexes for some or all of the data stored in data storage 125. (e.g., non-hierarchy-based relationship indexes such as matrix relationship indexes, HR relationship indexes, etc.; user ID indexes; user attribute indexes; etc.).

Index manager 210 may manage indexes used for data compression, as explained above. For example, index manager 210 may receive requests for data (e.g., user IDs, user attributes, non-hierarchy-based relationships, etc.) based on index values. When index manager 210 receives a request specifying an index value, index manager 210 accesses the associated index to retrieve data that corresponds to the index value. Similarly, when index manager 210 receives a request specifying a data value, index manager 210 accesses the associated index to retrieve an index value that corresponds to the data value.

Update manager 215 is responsible for managing updates to the representation of the hierarchy and the indexes generated by RBP processor 205. For example, when a change occurs to hierarchy definition 130, update manager 215 updates the representation of the hierarchy. In some embodiments, update manager 215 updates the portion of the hierarchy where the change occurred (as opposed to updating the entire representation of the hierarchy). Similarly, when a change occurs to data stored in data storage 125, update manager 215 updates the indexes associated with the data change.

Hierarchy manager 220 may be responsible for determine valid target users based on an RBP. When hierarchy manager 220 receives from RBP processor 205 a request that specifies an RBP and a base user, hierarchy manager 220 determines valid target users in the target group based on the RBP. If the RBP includes a relationship condition that specifies hierarchy-based relationships or a combination of hierarchy-based relationships and non-hierarchy-based relationships, hierarchy manager 220 accesses the representation of the hierarchy of users in order to identify valid target users. If the RBP includes a relationship condition that specifies non-hierarchy-based relationships, hierarchy manager 220 accesses (e.g., by using non-hierarchy-based relationship indexes) the non-hierarchy-based relationships in order to identify valid target users. Upon determining valid target users, hierarchy manager 220 returns the set of valid target users to RBP processor 205.

Figure 3:
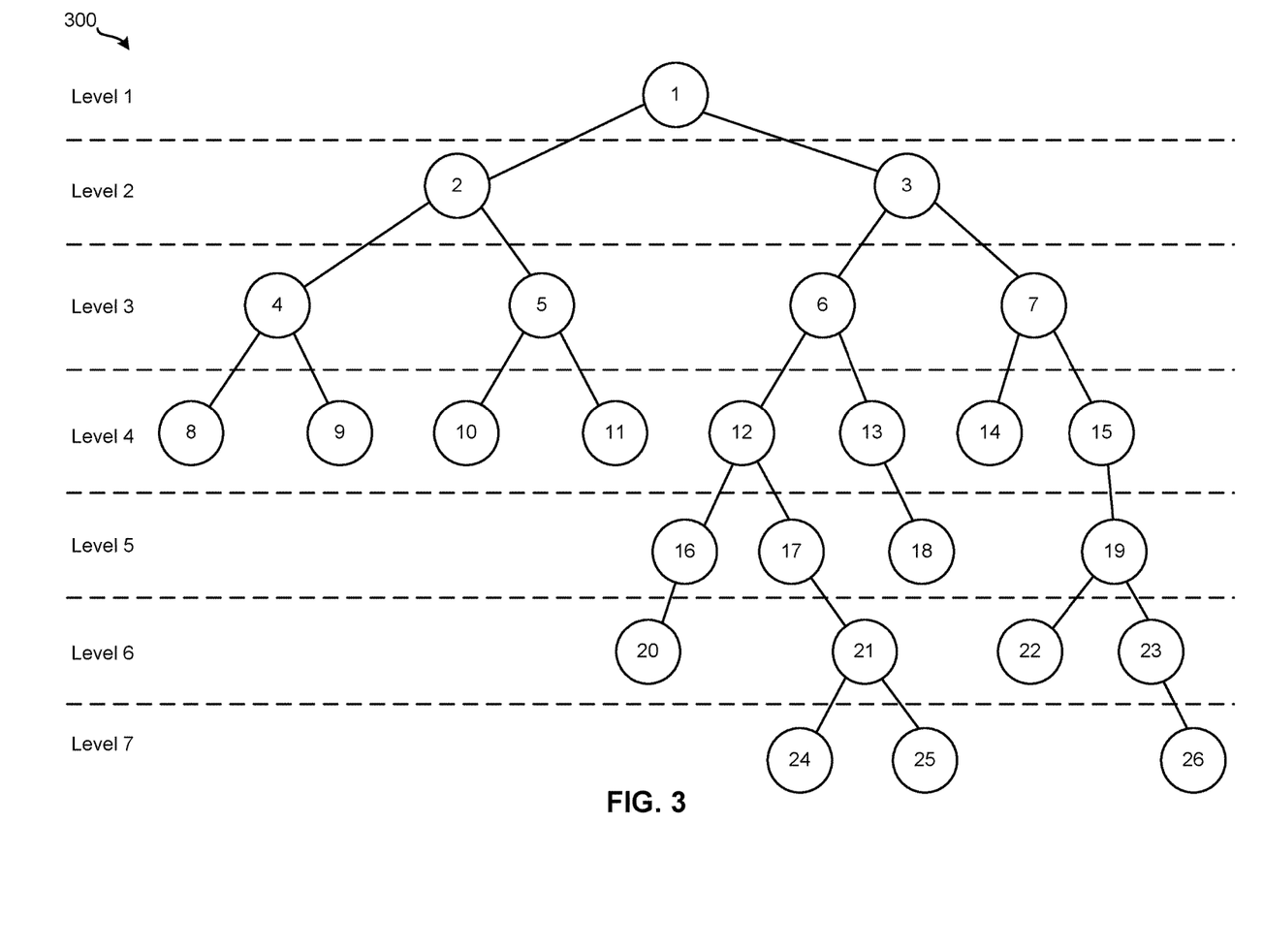
FIG. 3 illustrates an example hierarchy according to some embodiments.

FIG. 3 illustrates an example hierarchy 300 according to some embodiments. In some embodiments, hierarchy 300 is defined by a hierarchy definition (e.g., hierarchy definition 130). As shown, hierarchy 300 includes nodes 1-26, which are organized along seven different levels of hierarchy 300. For this example, hierarchy 300 is a manager-employee hierarchy of employees in an organization and nodes 1-26 each represents an employee in the organization. Each parent-child relationship represents a manager-employee relationship in the organization. In some embodiments, a hierarchy of users includes three or more levels of users.

Figure 4:
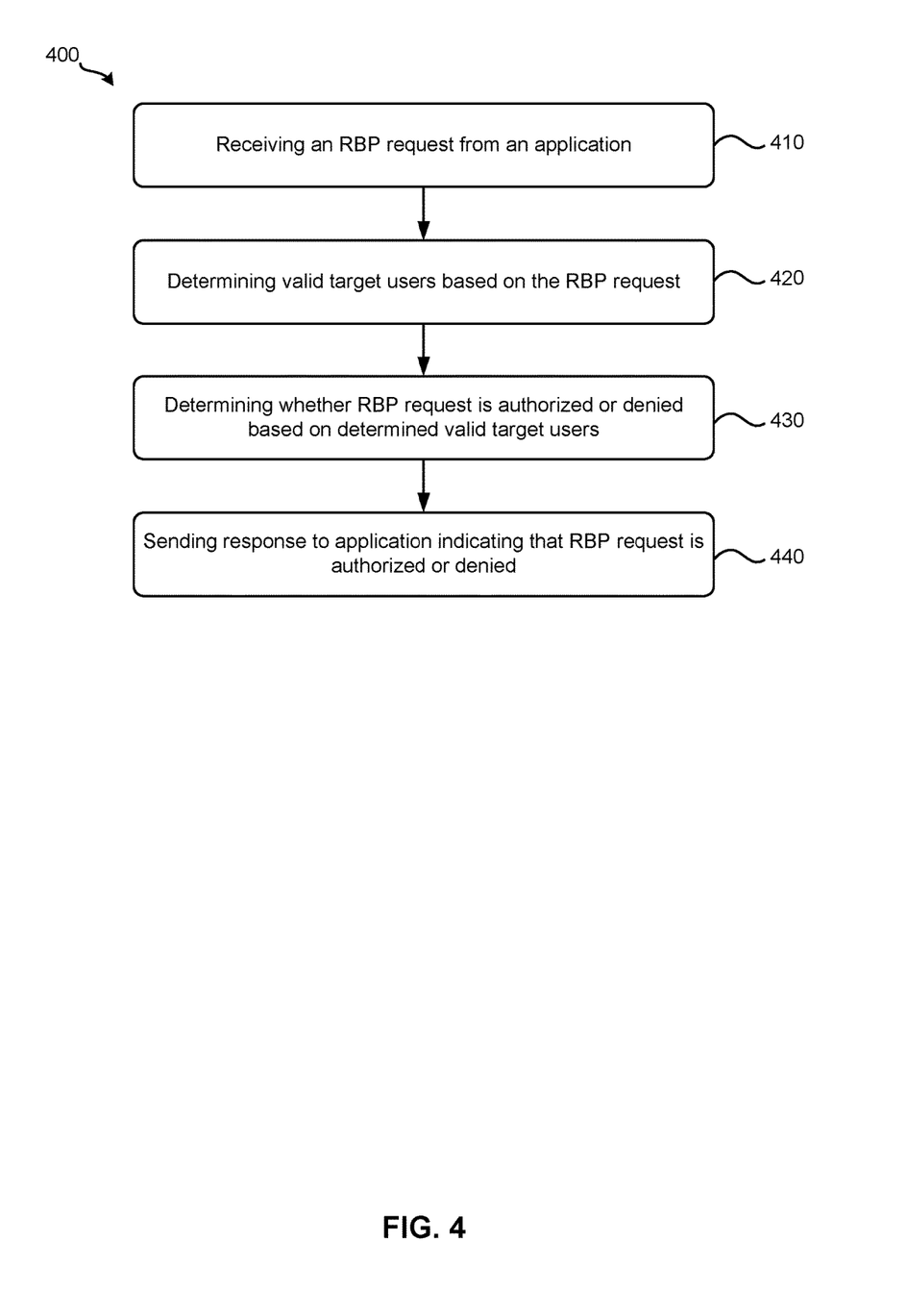
FIG. 4 illustrates a process for processing an RBP according to some embodiments.

FIG. 4 illustrates a process 400 for processing an RBP according to some embodiments. In some embodiments, a RBP manager (e.g., RBP manager 120) performs process 400 to process an RBP for an application (e.g., an application 115). Process 400 starts by receiving, at 410, an RBP request from an application. As mentioned above, an RBP request, in some embodiments, includes an RBP, a requesting user, and a requested user. Referring to FIG. 3 as an example, an RBP request may include an RBP that specifies an access group that includes nodes 2, 3, 5, 6 and 7; a target group that includes nodes 4, 6, 8, 10, 17, 19, 20, and 26; and a hierarchy-based relationship condition that specifies hierarchy 300 and a descendant distance threshold of three. The RBP request in this example also indicates node 3 as the requesting user and node 20 as the requested user.

Next, process 400 determines, at 420, valid target users based on the RBP, the requesting user, and requested user. As mentioned above, in some embodiments, a valid target user is a target group user that has a relationship with a requesting user that satisfies the relationship condition specified in the RBP. Continuing with the example above, the RBP relationship condition is a hierarchy-based relationship condition that specifies hierarchy 300 and a descendant distance threshold of three. For this example, process 400 determines that nodes 6, 17, and 19 are valid target users because nodes 6, 17, and 19 belong to the target group, are child or descendant nodes of node 3 (the requesting user), and are within three levels of node 3. Nodes 4, 8, 10 are not valid target users because nodes 4, 8, 10 are not child nodes of node 3. Nodes 20 and 26 are not valid target users because nodes 20 and 26 are four levels way from node 3.

As another example, a RBP with the same access group and target group as the example above may include a relationship condition that specifies the following non-hierarchy-based relationship condition: node 3 is a matrix manager for nodes 4, 11, and 12. In this example, node 4 is a valid target user because node 4 belongs to the target group and is related to node 3 (the requesting user) according to matrix relationship. Nodes 6, 8, 10, 17, 19, 20, and 26 are not valid target users because they are not related to node 3 according to the non-hierarchy-based relationship condition.

As yet another example, a RBP with the same access group and target group as the examples above may include a relationship condition that includes the example non-hierarchy-based relationship condition above and a hierarchy-based condition that specifies hierarchy 300 and a descendant distance threshold of two. A valid target user in this example may be a node that relates to node 3 according to the matrix relationship or a node that is within a two levels of a matrix report. For this example, node 4 is still a valid target user. Node 8 is also a valid target user because node 8 is within two levels of node 4, which is a matrix report of node 3. Nodes 17 and 20 are also valid target users because nodes 17 and 20 are within two levels of node 12, which is a matrix report of node 3. Nodes 6, 10, 19, and 26 are not valid target users because they are not related to node 3 according to the non-hierarchy-based relationship condition nor are they within two levels of a matrix report of node 3.

Returning to FIG. 4, process 400 then determines, at 430, whether the requesting user is authorized to perform actions specified in the RBP on the requested user based on the determined valid target users. In some embodiments, process 400 determines that the requesting user is authorized to perform the actions specified in the RBP on the requested user when the requesting user belongs to the access group specified in the RBP and the requested user is a determined valid target user. For the examples described above, process 400 determines the node 3 is not authorized to perform the set of actions specified in the RBP on node 20 because node 20 was not a valid target user in any of the examples.

As explained above, in some embodiments, a RBP may specify an ancestor distance threshold. In some such embodiments, when the requesting user is authorized to perform the set of actions on the requested user, an ancestor of requesting user may also be authorized to perform the set of actions on the requested user if the level difference between the ancestor of the requesting user and the requesting user is within the ancestor distance threshold (and a level difference between the requesting user and the requested user is within the descendant distance threshold). Continuing with the example RBP request described above that includes a hierarchy-based relationship condition, the RBP request may specify node 1 as the requesting user and node 17 as the requested user, node 1; and the RBP may also include an ancestor distance threshold of two. In this example, the level difference between node 1 and node 3 is within the ancestor distance threshold of two and the level difference between node 3 and node 17 is within the descendant distance threshold of three. Thus, process 400 may determine that node 1 is authorized to perform the set of actions specified in the RBP on node 17 even though the RBP does not explicitly specify node 1 in the access group. Finally, process 400 sends, at 440, a response to the application indicating that the RBP request is authorized or denied based on the determination at operation 430.

Figure 5:
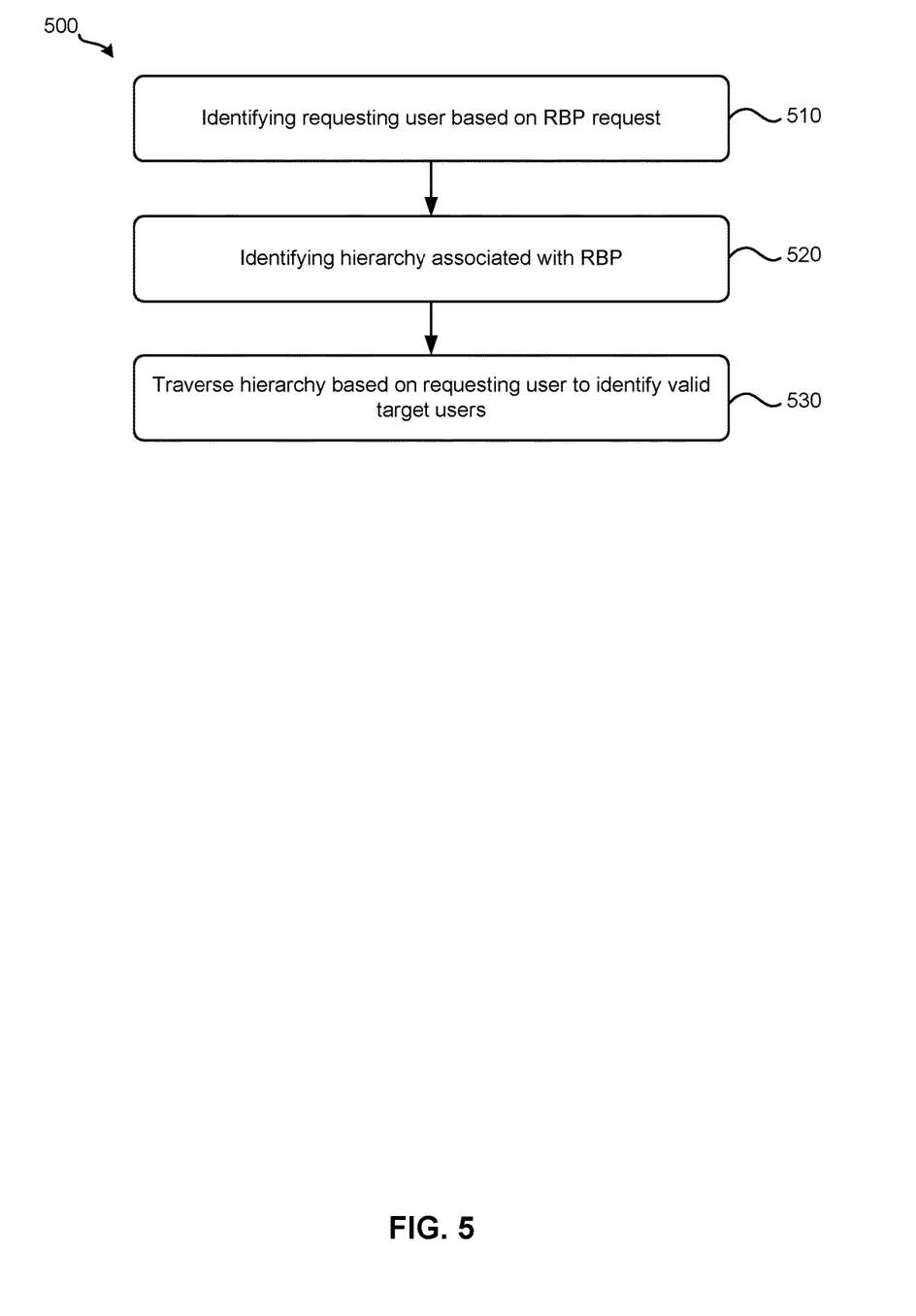
FIG. 5 illustrates a process for determining target users based on a hierarchy-based relationship according to some embodiments.

FIG. 5 illustrates a process 500 for determining target users based on a hierarchy-based relationship according to some embodiments. In some embodiments, process 400 performs process 500 when performing operation 420 for a RBP that includes a hierarchy-based relationship condition. Process 500 begins by identifying, at 510, a requesting user based on an RBP request. As mentioned above, a RBP request may include an RBP, a requesting user, and a requested user. Referring to the example RBP request described above by reference to FIG. 4, node 3 is the requesting user.

Next, process 500 identifies, at 520, a hierarchy associated with a RBP for processing RBP request. In some embodiments, process 500 identifies the representation of the hierarchy specified in the RBP. Referring to the example RBP request described above by reference to FIG. 4 that includes a non-hierarchy-based relationship condition, process 500 identifies hierarchy 300.

Finally, process 500 traverses, at 530, the identified hierarchy based on the identified requesting user. As mentioned above, in some embodiments, a representation of a hierarchy (e.g. a tree data structure) a may be used to process RBPs. In some such embodiments, process 500 traverses the representation of the hierarchy using to a depth-first approach. For example, a depth-first approach traversal of the nodes in hierarchy 300 may be the following: 1, 2, 4, 8, 9, 5, 10, 11, 3, 6, 12, 16, 20, 17, 21, 24, 25, 13, 18, 7, 14, 15, 19, 22, 23, 26. Referring to the example RBP request described above by reference to FIG. 4, process 500 may traverse hierarchy 300 by starting at the requesting user, which is node 3 in this example. In some embodiments, process 500 forgoes traversing deeper nodes when process 500 reaches a node that is farther than the specified descendant distance threshold. For example, when process 500 reaches node 21, process 500 determines that node 21 is more than three levels away from node 3 and, thus, does not traverse to nodes 24 and 25. Instead, process 500 continues traversing hierarchy 300 by proceeding to node 13.

Figure 6:
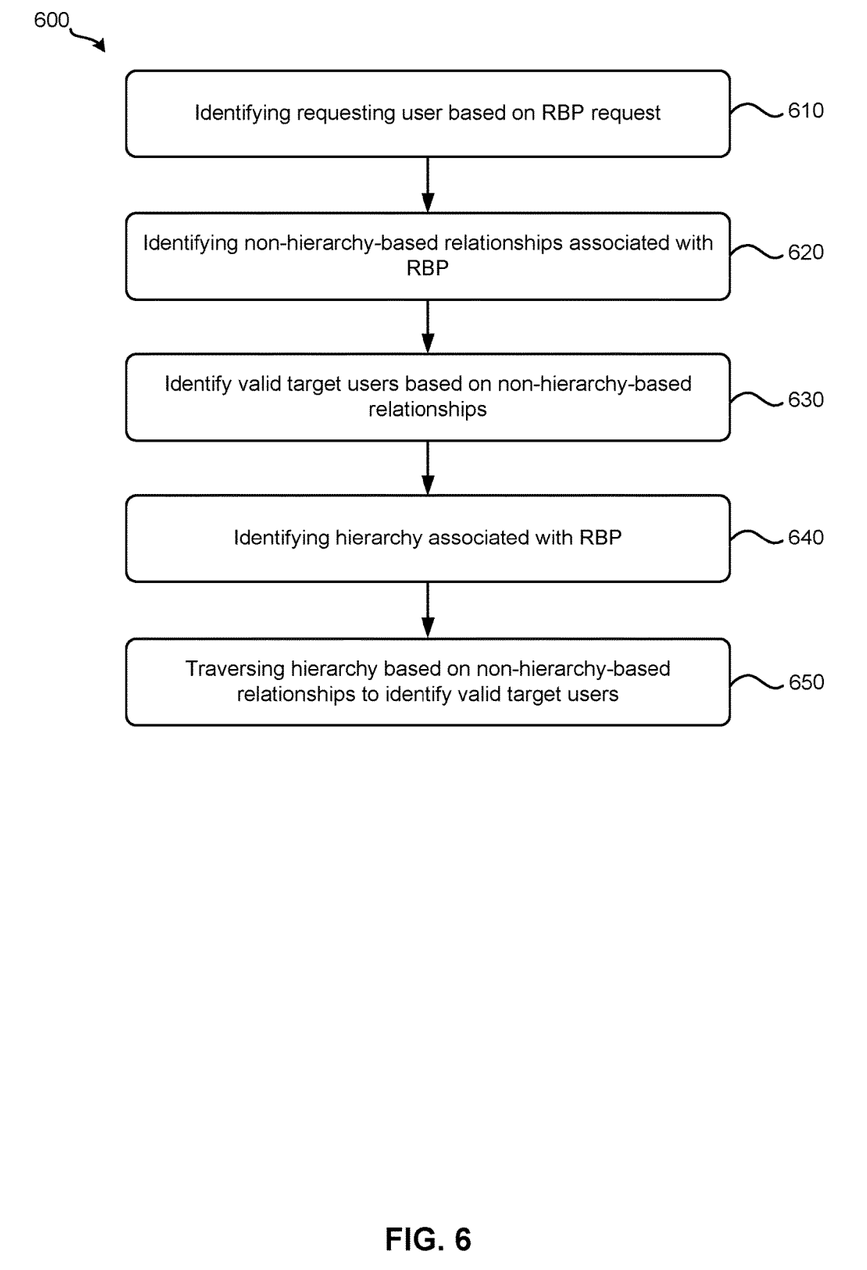
FIG. 6 illustrates a process for determining target users based on a non-hierarchy-based relationship according to some embodiments.

FIG. 6 illustrates a process 600 for determining target users based on a non-hierarchy-based relationship according to some embodiments. In some embodiments, process 400 performs process 600 when performing operation 420 for a RBP that includes a non-hierarchy-based relationship condition or a combination of a non-hierarchy-based relationship condition and a hierarchy-based relationship condition. Process 600 begins by identifying, at 610, a requesting user based on an RBP request. As mentioned above, a RBP request may include an RBP, a requesting user, and a requested user. Referring to the example RBP request described above by reference to FIG. 4, node 3 is the requesting user.

Next, process 600 identifies, at 620, non-hierarchy-based relationships for processing RBP request. In some embodiments, process 520 identifies the non-hierarchy-based relationships specified in the RBP. Referring to the example RBP described above by reference to FIG. 4 that includes a non-hierarchy-based relationship condition, process 600 identifies the matrix relationship that specifies node 3 as a matrix manager of nodes 4, 11, and 12.

Process 600 then identifies, at 630, valid target users based on the non-hierarchy-based relationships. In some embodiments, process 600 identifies valid target users by identifying target group users that are specified in the non-hierarchy-based relationship. Referring to the example RBP described above by reference to FIG. 4 that includes a non-hierarchy-based relationship condition, process 600 identifies node 4 as a valid target user since the non-hierarchy-based relationship specifies node 4 as a matrix report of node 3. For a RBP that includes a non-hierarchy-based relationship condition, process 600 ends. For a RBP that includes a combination of a non-hierarchy-based relationship condition and a hierarchy-based relationship condition, process 600 continues to 640.

At 640, process 600 identifies a hierarchy associated with a RBP for processing RBP request. In some embodiments, process 600 identifies the representation of the hierarchy specified in the RBP. Referring to the example RBP request described above by reference to FIG. 4 that includes a combination of a non-hierarchy-based relationship condition and a hierarchy-based relationship condition, process 600 identifies hierarchy 300.

Finally, process 600 traverses, at 650, the identified hierarchy based on the non-hierarchy-based relationships to identify valid target users. For an RBP that includes a combination of a non-hierarchy-based relationship condition and a hierarchy-based relationship condition, a valid target user may be a target group user that is related to the requesting user according to the specified non-hierarchy-based relationship condition or a target group user that is related to a child specified in the non-hierarchy-based relationship condition according to the hierarchy-based relationship condition. Referring to the example RBP request described above by reference to FIG. 4 that includes a combination of a non-hierarchy-based relationship condition and a hierarchy-based relationship condition, a valid target user is a target group user that relates to node 3 according to the matrix relationship or a target group user that is within a two levels of a matrix report. In this example, process 600 starts at node 4, the first matrix report in the non-hierarchy-based relationship condition, and traverses the hierarchy 300 from node 4 to nodes 8 and then 9. Process 600 identifies node 8 as a valid target user because node 8 is a target group user that is within two levels of node 4. Process 600 then proceeds to node 11, the next matrix report in the non-hierarchy-based relationship condition. Since node 11 does not have any child nodes, process 600 proceeds to node 12, the next and final matrix report in the non-hierarchy-based relationship condition. From node 12, process 600 traverses to nodes 16, 20, 17, 21, 24, and then 25. Process 600 identifies nodes 17 and 20 because nodes 17 and 20 are target group users that are within two levels of node 12.

Figure 7:
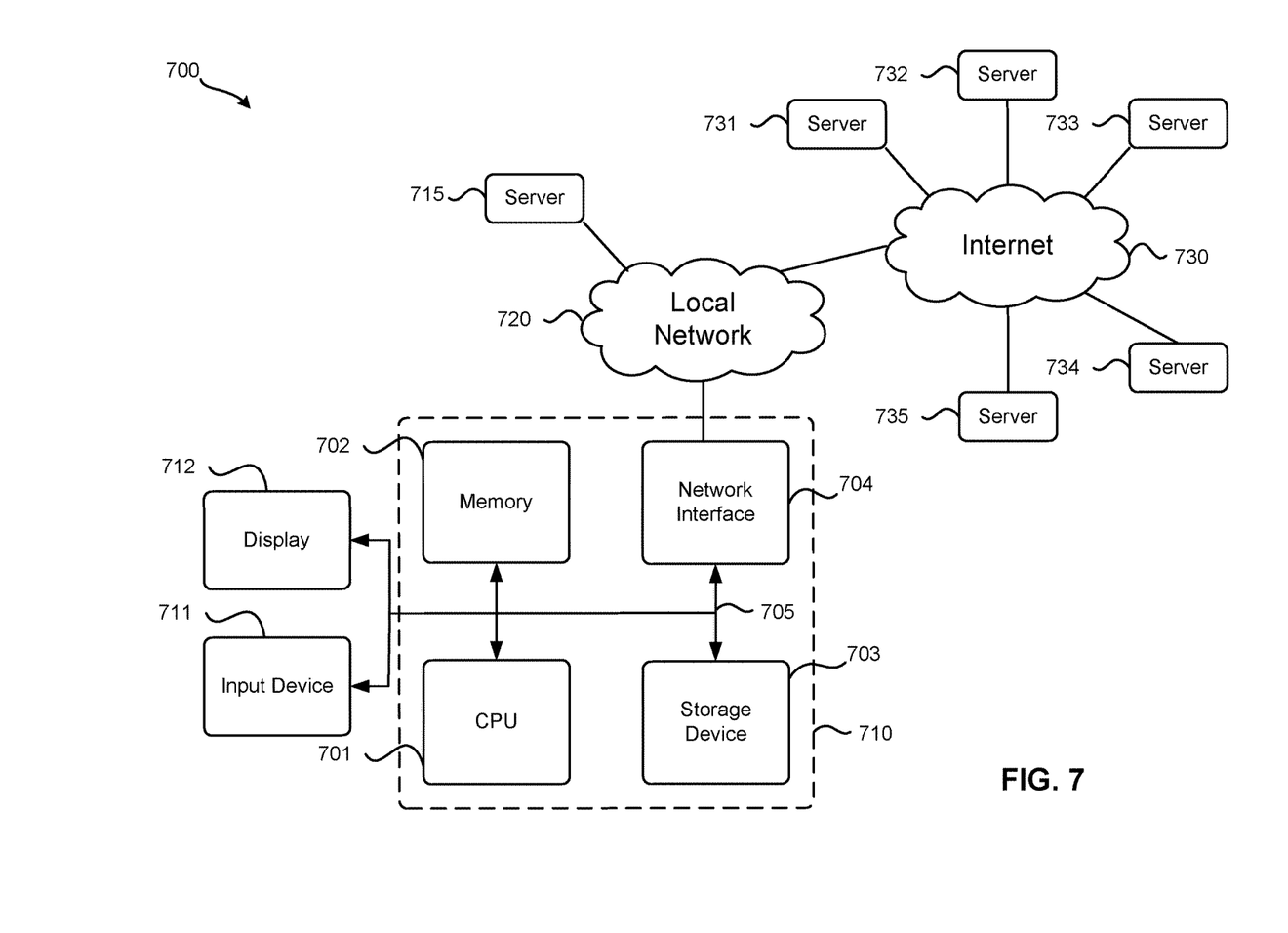
FIG. 7 illustrates an exemplary computer system according to some embodiments.

FIG. 7 illustrates an exemplary computer system according to some embodiments. An exemplary computer system 700 is illustrated in FIG. 7. Computer system 710 includes a bus 705 or other communication mechanism for communicating information, and a processor 701 coupled with bus 705 for processing information. Computer system 710 also includes memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving a request from a first user of a client device to perform an action on a second user, the action provided by an application operating on the device;
   processing a role-based permission (RBP) associated with the first user in response to the request, wherein the RBP specifies a set of actions comprising accessing data and accessing a set of applications operating on the device, a first set of users authorized to perform the set of actions, a second set of users on which the first set of users is authorized to perform the set of actions, and a relationship condition, wherein the first set of users is a first subset of a plurality of users and the second set of users is a second subset of the plurality of users;
   determining whether the relationship condition of the RBP specifies a hierarchy-based relationship or a non-hierarchy-based relationship, wherein a representation of the hierarchy-based-relationship comprises a tree data structure and wherein the non-hierarchy-based relationship comprises a matrix relationship;
   determining valid users in the second set of users according to a hierarchy of users stored in a memory of the device, when the relationship condition of the RBP specifies the hierarchy-based relationship, wherein the hierarchy of users comprising the plurality of users;
   determining valid users in the second set of users according to a set of indexes implemented on the device and configured to store data associated with a set of non-hierarchy-based relationships, when the relationship condition of the RBP specifies the non-hierarchy-based relationship;
   determining whether the first user is authorized to perform the set of actions on the second user based on the determined valid users by:
     determining whether the first user is specified in the first set of users;
     determining whether the second user is specified in the valid users; and
     determining that the first user is authorized to perform the set of actions on the second user when the first user is determined to be specified in the first set of users and the second user is determined to be specified in the valid users;
   sending a first response to the application indicating that the first user is authorized to perform the set of actions on the second user when the first user is determined to be authorized to perform the set of actions on the second user; and
   sending a second response to the application indicating that the first user is not authorized to perform the set of actions on the second user when the first user is determined to not be authorized to perform the set of actions on the second user.

2. The non-transitory machine-readable medium of claim 1, wherein determining whether the first user is authorized to perform the set of actions on the second user further comprises determining that the first user is not authorized to perform the set of actions on the second user when the first user is determined to not be specified in the first set of users or when the second user is determined to not be specified in the valid users.

3. The non-transitory machine-readable medium of claim 1, wherein the hierarchy-based relationship specifies the hierarchy of users, a descendant distance threshold, and an ancestor distance threshold, wherein determining valid users in the second set of users according to the hierarchy of users when the relationship condition specifies a hierarchy-based relationship comprises determining that the user in the second set of users is a valid user when a first level difference between the user in the second set of users and a user in the first set of users is within the descendant distance threshold and a second level difference between the user in the first set of users and the first user is within the ancestor distance threshold.

4. The non-transitory machine-readable medium of claim 1, wherein the hierarchy-based relationship specifies the hierarchy of users and a descendant distance threshold, wherein the set of instructions for determining valid users in the second set of users according to the hierarchy of users when the relationship condition specifies the hierarchy-based relationship comprises a set of instructions for determining that a user in the second set of users is a valid user when the user in the second set of users is a child or descendant of the first user and a level difference between the user in the second set of users and the first user is within the descendant distance threshold.

5. The non-transitory machine-readable medium of claim 1, wherein the valid users comprises some, but not all, users that are descendants of the first user in the hierarchy of users.

6. A method, performed by a device, comprising:
receiving a request from a first user of a client device to perform an action on a second user, the action provided by an application operating on the device;
processing a role-based permission (RBP) associated with the first user in response to the request, wherein the RBP specifies a set of actions comprising accessing data and accessing a set of applications operating on the device, a first set of users authorized to perform the set of actions, a second set of users on which the first set of users is authorized to perform the set of actions, and a relationship condition, wherein the first set of users is first subset of a plurality of users and the second set of users is a second subset of the plurality of users;
determining whether the relationship condition of the RBP specifies a hierarchy-based relationship or a non-hierarchy-based relationship, wherein a representation of the hierarchy-based-relationship comprises a tree data structure and wherein the non-hierarchy-based relationship comprises a matrix relationship;
determining valid users in the second set of users according to a hierarchy of users stored in a memory of the device, when the relationship condition of the RBP specifies the hierarchy-based relationship, wherein the hierarchy of users comprising the plurality of users;
determining valid users in the second set of users according to a set of indexes implemented on the device and configured to store data associated with a set of non-hierarchy-based relationships, when the relationship condition of the RBP specifies the non-hierarchy-based relationship;
determining whether the first user is authorized to perform the set of actions on the second user based on the determined valid users by:
determining whether the first user is specified in the first set of users;
determining whether the second user is specified in the valid users; and
determining that the first user is authorized to perform the set of actions on the second user when the first user is determined to be specified in the first set of users and the second user is determined to be specified in the valid users;
sending a first response to the application indicating that the first user is authorized to perform the set of actions on the second user when the first user is determined to be authorized to perform the set of actions on the second user; and
sending a second response to the application indicating that the first user is not authorized to perform the set of actions on the second user when the first user is determined to not be authorized to perform the set of actions on the second user.

7. The method of claim 6, wherein the hierarchy-based relationship specifies the hierarchy of users and a descendant distance threshold, wherein determining valid users in the second set of users according to the hierarchy of users when the relationship condition specifies the hierarchy-based relationship comprises determining that a user in the second set of users is a valid user when the user in the second set of users is a child or descendant of the first user and a level difference between the user in the second set of users and the first user is within the descendant distance threshold.

8. The method of claim 6, wherein the hierarchy-based relationship specifies the hierarchy of users, a descendant distance threshold, and an ancestor distance threshold, wherein determining valid users in the second set of users according to the hierarchy of users when the relationship condition specifies the hierarchy-based relationship comprises determining that a user in the second set of users is a valid user when a first level difference between the user in the second set of users and a user in the first set of users is within the descendant distance threshold and a second level difference between the user in the first set of users and the first user is within the ancestor distance threshold.

9. The method of claim 6, wherein determining whether the first user is authorized to perform the set of actions on the second user further comprises determining that the first user is not authorized to perform the set of actions on the second user when the first user is determined to not be specified in the first set of users or when the second user is determined to not be specified in the valid users.

10. The method of claim 6, wherein the valid users comprises some, but not all, users that are descendants of the first user in the hierarchy of users.

11. A system comprising:
a set of processing units;
a memory; and
a non-transitory machine-readable medium storing instructions that when executed by at least one processing unit in the set of processing units cause the at least one processing unit to:
receive a request from a first user of a client device to perform an action on a second user, the action provided by an application operating on the system;
process a RBP associated with the first user in response to the request, wherein the RBP specifies a set of actions comprising accessing data and accessing a set of applications operating on the device, a first set of users authorized to perform the set of actions, a second set of users on which the first set of users is authorized to perform the set of actions, and a relationship condition, wherein the first set of users is first subset of a plurality of users and the second set of users is a second subset of the plurality of users;

determine whether the relationship condition of the RBP specifies a hierarchy-based relationship or a non-hierarchy-based relationship, wherein a representation of the hierarchy-based-relationship comprises a tree data structure and wherein the non-hierarchy-based relationship comprises a matrix relationship;

determine valid users in the second set of users according to a hierarchy of users stored in a memory of the system, when the relationship condition of the RBP specifies the hierarchy-based relationship, wherein the hierarchy of users comprising the plurality of users;

determine valid users in the second set of users according to a set of indexes implemented on the system and configured to store data associated with a set of non-hierarchy-based relationships, when the relationship condition of the RBP specifies the non-hierarchy-based relationship; and determine whether the first user is authorized to perform the set of actions on the second user based on the determined valid users by:

determining whether the first user is specified in the first set of users;

determining whether the second user is specified in the valid users; and determining that the first user is authorized to perform the set of actions on the second user when the first user is determined to be specified in the first set of users and the second user is determined to be specified in the valid users;

send a first response to the application indicating that the first user is authorized to perform the set of actions on the second user when the first user is determined to be authorized to perform the set of actions on the second user; and send a second response to the application indicating that the first user is not authorized to perform the set of actions on the second user when the first user is determined to not be authorized to perform the set of actions on the second user.

12. The system of claim 11, wherein determining whether the first user is authorized to perform the set of actions on the second user further comprises determining that the first user is not authorized to perform the set of actions on the second user when the first user is determined to not be specified in the first set of users or when the second user is determined to not be specified in the valid users.

13. The system of claim 11, wherein the hierarchy-based relationship specifies the hierarchy of users and a descendant distance threshold, wherein determining valid users in the second set of users according to the hierarchy of users when the relationship condition specifies the hierarchy-based relationship comprises determining that a user in the second set of users is a valid user when the user in the second set of users is a child or descendant of the first user and a level difference between the user in the second set of users and the first user is within the descendant distance threshold.

14. The system of claim 11, wherein the hierarchy-based relationship specifies the hierarchy of users, a descendant distance threshold, and an ancestor distance threshold, wherein determining valid users in the second set of users according to the hierarchy of users when the relationship condition specifies the hierarchy-based relationship comprises determining that a user in the second set of users is a valid user when a first level difference between the user in the second set of users and a user in the first set of users is within the descendant distance threshold and a second level difference between the user in the first set of users and the first user is within the ancestor distance threshold.

15. The system of claim 11, wherein the valid users comprises some, but not all, users that are descendants of the first user in the hierarchy of users.

16. The non-transitory machine-readable medium of claim 1, wherein determining valid users in the second set of users according to the hierarchy of users stored in the memory of the system, when the relationship condition of the RBP specifies the hierarchy-based relationship, comprises traversing the hierarchy of users using a depth-first approach.

17. The method of claim 6, wherein determining valid users in the second set of users according to the hierarchy of users stored in the memory of the system, when the relationship condition of the RBP specifies the hierarchy-based relationship, comprises traversing the hierarchy of users using a depth-first approach.

18. The system of claim 11, wherein determining valid users in the second set of users according to the hierarchy of users stored in the memory of the system, when the relationship condition of the RBP specifies the hierarchy-based relationship, comprises traversing the hierarchy of users using a depth-first approach.

19. The non-transitory machine-readable medium of claim 1, wherein the relationship condition of the RBP specifies the hierarchy-based relationship and the non-hierarchy-based relationship.

20. The method of claim 6, wherein the relationship condition of the RBP specifies the hierarchy-based relationship and the non-hierarchy-based relationship.

* * * * *